United States Patent [19]

Singerle et al.

[11] 4,123,987
[45] Nov. 7, 1978

[54] SIGNAL BALLOON DEVICE

[75] Inventors: Richard C. Singerle, Portland; Gail M. Denman, Hillsboro, both of Oreg.

[73] Assignee: Res-Q-Devices, Inc., Hillsboro, Oreg.

[21] Appl. No.: 824,789

[22] Filed: Aug. 15, 1977

[51] Int. Cl.² .............................................. B64B 1/50
[52] U.S. Cl. .......................... 116/124 B; 116/DIG. 8; 116/DIG. 9; 343/18 B; 422/239
[58] Field of Search ...... 116/124 B, DIG. 8, DIG. 9; 244/31, 33; 23/282; 48/61; 343/18 B

[56] References Cited

U.S. PATENT DOCUMENTS

| | | | |
|---|---|---|---|
| 1,017,495 | 2/1912 | Bellamy | 23/282 |
| 2,334,211 | 11/1943 | Miller | 23/282 |
| 2,395,006 | 2/1946 | Leslie | 206/227 |
| 2,463,862 | 3/1949 | Gibadlo | 23/282 |
| 2,463,863 | 3/1949 | Gibadlo | 23/282 |
| 2,636,019 | 7/1953 | Chetlan | 521/35 |
| 2,758,203 | 8/1956 | Harris | 343/18 B |
| 2,923,917 | 2/1960 | McPherson et al. | 116/124 B |
| 3,941,079 | 3/1976 | McNeil | 116/124 B |

OTHER PUBLICATIONS

Military Specification MIL-C-1135C(EL); Dec. 7, 1962.
An article "Calcium Hydride" distributed by Metal Hydrides Incorporated; of Beverly, Mass.
"Metal Hydrides for Hydrogen Generation" leaflet of Ventron Corp., Chemicals Division; Congress Street, Beverly, Mass.

Primary Examiner—S. Clement Swisher
Assistant Examiner—Denis E. Corr
Attorney, Agent, or Firm—Klarquist, Sparkman, Campbell, Leigh, Hall & Whinston

[57] ABSTRACT

A compact signal balloon device includes a special charge container having a liner for holding a first reacting chemical and preventing its egress through access holes provided in a wall of the charge container. The device also includes an activation container which holds a second reacting chemical and which is adapted to receive the charge container to effect mixing and reaction of the chemicals to produce a lighter-than-air gas. A balloon seals the activation container and is inflated by the gas generated by the reaction. The balloon is then sealed and detached and then released on the end of a line. A detachable covering member over the access holes seals the holes and prevents inadvertent reacting prior to the time that the charge container is placed in the activation container. A piece of reflective metallic material is carried by the balloon and increases its detectability. Also, a transmitter may be attached to the balloon to transmit its location.

10 Claims, 6 Drawing Figures

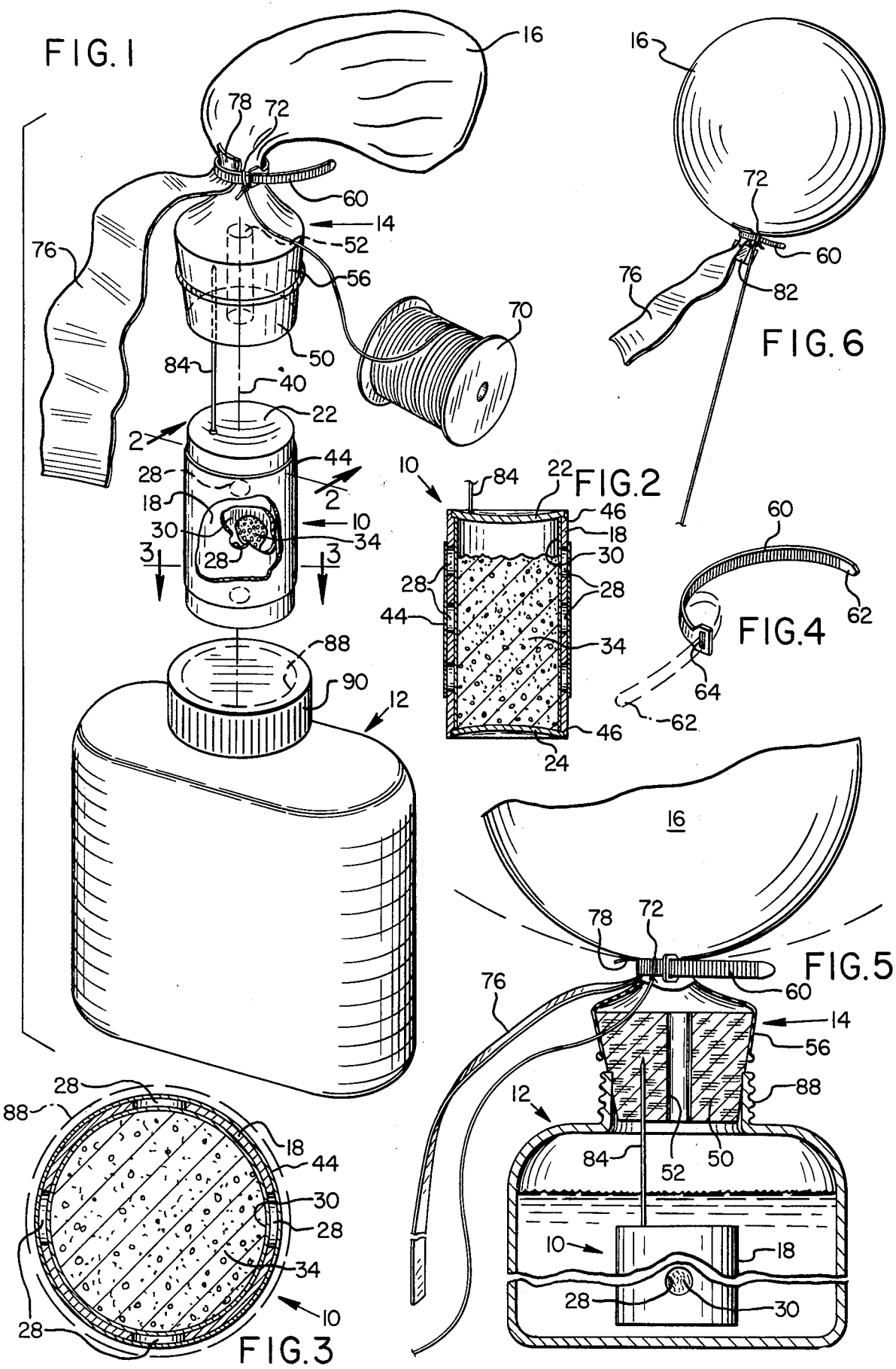

SIGNAL BALLOON DEVICE

BACKGROUND OF THE INVENTION

1. Field of the Invention

The present invention relates to a signal balloon device employing chemical substances that react to produce a lighter-than-air gas which inflates a locating balloon.

2. Description of the Prior Art

Various types of signal balloon devices have been suggested. However, as exemplified by U.S. Pat. No. 2,646,019 of Chetland, such devices typically have a canister for compressed gas which is opened to inflate a locating balloon. One common drawback of compressed gas type signal balloon devices is the relatively bulky and heavy canister required to hold sufficient compressed gas to inflate a balloon of reasonable size. This bulk and weight makes such devices inconvenient for backpackers and others who desire lightweight easily portable equipment. Another disadvantage of these devices is the high cost of compressed gas canisters.

In addition to the above known devices, military specification MIL-31-115C, EL, dated Dec. 7, 1962, mentions a device for combining calcium hydride with water to produce hydrogen gas. The gas is then used to inflate meterological balloons. The calcium hydride is encased in a sealed metal canister attached to a hydrogen generator, the canisters having scored knockout holes which are punched open to permit the entrance of water and the escape of hydrogen gas during the gas generating process. It is believed that the military device is bulky and heavy, thereby making it difficult to transport. Also, it is believed that this device does not include an integral balloon and charge container assembly with the balloon being detachable when filled. Furthermore, this device apparently requires the time consuming step of opening knockout holes with separately carried tools before the calcium hydride and water may be mixed.

SUMMARY OF THE INVENTION

The present invention is a signal balloon device including a special charge container means for containing a first substance. The charge container has a plurality of apertures so that when it is placed in an activation container means holding a second substance, the second substance passes through the apertures and reacts with the first substance to produce a lighter-than-air gas. A balloon assembly means captures the lighter-than-air gas so that it inflates a locating balloon means of the assembly.

A particular feature of the invention is a liner means positioned within the charge container for preventing the first substance from passing out of the charge container through the apertures.

Another feature of the present invention is a one-piece covering means for covering the apertures.

As another feature of the invention, the charge container is a cylinder with the apertures equally spaced around its circumference.

As a more specific feature of the invention, the apertures are through a wall of the charge container, the liner is positioned inside the charge container adjacent the wall and the covering means comprises a covering strip attached to the outside of the charge container and separated from the liner means by the wall. The strip is removable from the charge container without rupturing the liner.

As still another feature of the invention, the balloon assembly is attached to one end of the charge container so that when the charge container is placed in the activation container the assembly is in position to seal the activation container and capture the lighter-than-air gas.

As a further feature of the invention, the longitudinal axis of the charge container and the longitudinal axis of the balloon assembly are the same. This facilitates placement of the charge container in the activation container and sealing of the activation container by the balloon assembly.

Another feature of the present invention is the inclusion in the activation container of more of the second substance than is needed for the complete reaction of the first and second substances, the excess second substance aiding in the dissipation of heat produced during the reaction away from the charge container.

A still further feature of the balloon assembly is a reflective metallic material attached to the balloon to increase the balloon's detectability when it is aloft.

Still another feature of the invention is a transmitter carried by the balloon to transmit its location which uses the reflective material as an antenna.

A primary object of the invention is to provide an improved signal balloon device which is inexpensive and easy to use.

Another object is to provide such a signal balloon device which is lightweight, portable, and usable under adverse or emergency conditions.

Another object is to provide such a signal balloon device which produces a gas for inflating a locating balloon.

Still another object is to provide such a signal balloon device which is easily detectable from a long range and for a long time.

The foregoing and other objects, features and advantages of the present invention will become more apparent from the following detailed description which proceeds with reference to the accompanying drawing.

BRIEF DESCRIPTION OF THE DRAWING

In the drawing:

FIG. 1 is a perspective view of the signal balloon device of the present invention;

FIG. 2 is a cross sectional view of the charge container taken along line 2—2 of FIG. 1;

FIG. 3 is an enlarged cross sectional view of the charge container taken along line 3—3 of FIG. 2;

FIG. 4 is a perspective view of the cinch shown in FIG. 1;

FIG. 5 is a partially broken away side elevation view of the device of FIG. 1 with the charge container placed within the activation container; and FIG. 6 is a perspective view of the balloon of FIG. 1 when aloft.

DETAILED DESCRIPTION OF A PREFERRED EMBODIMENT

With reference to FIG. 1, a signal balloon device in accordance with the present invention includes a charge container means 10 for containing a first substance that reacts when placed in contact with a second substance contained in an activation container means 12 to produce a lighter-than-air gas. A balloon assembly means 14 traps the gas produced by the reaction in a locating balloon means 16 of the assembly so that the balloon inflates. The inflated balloon 16 floats upwardly for signaling purposes.

Although a number of substances are usable for the first substance, metal hydride substances are particularly suitable with the preferred substance being granulated calcium hydride ($CaH_2$). With calcium hydride as the first substance, the second substance is water and the lighter-than-air gas is hydrogen. When placed in contact with one another these two substances undergo the following reaction:

$$CaH_2 \text{ (solid)} + 4H_2O \text{ (liquid)} \rightarrow 4H_2 \text{ (gas)} + 2Ca(OH)_2 \text{ (aqueous)} + \text{heat.}$$

For purposes of explanation, and not as a limitation, the description proceeds with the first and second substances being described as calcium hydride and water, respectively.

CHARGE CONTAINER

The charge container 10 comprises a cylinder (FIG. 1) having a sleeve or wall portion 18, an upper concave end cap 22 and a lower concave end cap 24 (FIG. 2). The cylinder is preferably of a lightweight heat conducting material such as aluminum, to facilitate dissipation of heat produced during the reaction away from the charge container.

A plurality of apertures 28 are provided through wall portion 18. These apertures are positioned in a plurality of spaced apart rows with each row being generally located in a plane perpendicular to the longitudinal axis 40 of the charge container 10. As shwon in FIG. 3 for one row, the apertures 28 of each row are spaced apart at equal distances around the circumference of wall portion 18. This spacing permits water to pass through the apertures and evenly penetrate the calcium hydride powder 34 contained within charge container 10.

To provide room for expansion, the calcium hydride (FIG. 2) and water (FIG. 5) do not completely fill their respective containers.

Wall portion 18 is reamed to form a notch 46 (FIG. 2) around the inner periphery of each of its ends. These notches provide seats for caps 22, 24 which are press fit into the ends of the wall portion 18 and provide a watertight seal at the ends of the charge container 10.

A water permeable liner means 30 is positioned inside container 10 adjacent wall portion 18 to prevent the calcium hydride from passing outwardly from the charge container through the apertures. Liner 30 may be of a lightweight inexpensive filter paper of a type that allows the passage of water and hydrogen gas through it.

A removable covering means covers apertures 28 and prevents moisture from entering the charge container 10 and causing the reaction to occur when not desired. As shown in FIG. 1, the covering may comprise a covering strip 44 for covering the rows of apertures 28. A waterproof tape adhesively secured to the outer surface of wall portion 18 can be used for strip 44. With this arrangement, strip 44 may be easily and rapidly peeled away from wall portion 18 in one motion to uncover the apertures. Wall portion 18 separates liner 30 from strip 44. Therefore, when the strip is removed, the liner is not ruptured and the calcium hydride 34 remains inside charge container 10.

Balloon Assembly Means

Balloon assembly means 14 includes a stopper 50 having a hole 52 along its longitudinal axis 40. The neck 56 of locating balloon 16 is stretched over the stopper 50 to prevent gas, passing through hole 52 into the balloon, from escaping. Stopper 50 may be of a neoprene rubber material.

A conventional self-latching cinch of tab 60 is positioned above the stopper 50 around the neck 56 of the balloon. As shown in FIG. 4, an end 62 of tab 60 is threaded through a slot 64 to form a loop which surrounds the neck 56. Pulling end 62 tightens the loop to close the balloon. Ridges on the tab prevent the tab from loosening after it has been tightened. The use of a tab eliminates the difficult task of a person with fingers numbed by cold trying to seal the balloon 16 by tying a knot in its neck 56.

A spool of tethering line 70, of monofilament or other material, is attached at end 72 to the tab 60. When the inflated balloon is released, the line is played out until the balloon is at a desired height. A piece of shiny, metallic film-like foil material 76 has an end 78 inserted under tab 60. Tightening the tab secures the foil 76 to balloon 16. The foil reflects light and makes the balloon more visible when aloft. Foil 76 is detectable by radar thereby making the balloon easier to locate. In addition, the foil functions as an antenna for a transmitter 82 (FIG. 6) which may be attached by tab 60 to the balloon and carried aloft from which it transmits locating signals.

To decrease the porosity of the balloon, it may be made of a clay-filled latex material. This increases the time that the balloon remains aloft as it holds the lighter-than-air gas longer. The balloon is colored a bright orange to add to its visability.

A connecting rod 84 is welded at one end to cap 22 (FIG. 1) and has its other end inserted into stopper 50. Rod 84 rigidly secures the balloon assembly 14 and charge container 10 together. Therefore, when charge container 10 is inserted into activation container 12, stopper 50 is in position to seal activation container 12 so that the balloon traps the gas produced by the reaction. This interconnection of charge container 10 and balloon assembly 14 increases the reliability of the device. That is, absent such connection, a person who places charge container 10 into the activation container may be startled by the rapid reaction that takes place, and as a result, delay the capping of activation container 12 with the assembly means 14. This delay could allow a large amount of the gas to escape instead of filling the balloon. Furthermore, charge container 10 and stopper 50 are both aligned with the same longitudinal axis 40. This alignment facilitates the use of the device as only one motion is required to both insert charge container 10 into container 12 and seal the container 12 with balloon assembly 14.

Activation Container

As shown in FIGS. 1 and 5, container 12 has an externally threaded neck 88 to which an internally threaded cap 90 is secured to hold water therein. A small amount of alcohol may be added to this water to prevent freezing. Container 12 is conveniently formed of a lightweight plastic material. In many situations, such as on a boat, the user will have easy access to water. In these situations container 12 is kept normally empty to further reduce its weight and is filled with water just prior to use.

Operation

The signal balloon of the present invention is extremely simple to use. As a consequence, it can be employed even during adverse weather or emergency conditions.

To operate the device, strip 44 is removed (FIG. 5) and charge container 10 is immersed in the water within activation container 12. Stopper 50 engages neck 88 of activation container 12 and seals this container. Connecting rod 84 brings stopper 50 into contact with neck 88 at about the same time charge container 10 is submerged in the water. Because activation container 12 is sealed at about the same time the charge container is submerged, only a minimal amount of the gas escapes. After insertion of charge container 10, water passes through liner 30 and reacts with the calcium hydride in charge container 10. The resulting hydrogen gas passes outwardly from container 10 into container 12. From container 12, the gas passes through hole 52 into the locating balloon 16.

Container 12 holds approximately seven or more times the amount of water needed for the complete reaction of the calcium hydride to take place. The additional water dissipates heat from the reaction away from charge container 10. This dissipation of heat prevents water within the activation container 12 from boiling and therefore minimizes the production of steam. Introduction of steam into the balloon 16 would reduce its ability to float. Also, as hole 52 is of a smaller diameter than the opening into container 12, stopper 50 blocks water from splashing into the balloon in the event the container 12 is tilted during the inflation process.

Following inflation, tab 60 is tightened to close the balloon and the balloon is removed from the stopper. Line is played out from spool 70 so that the balloon floats upwardly to a desired height.

As previously mentioned, the device is extremely lightweight and compact. As a specific example, in one form that has been tested, the charge container 10 is slightly over two inches tall and one inch in diameter and the entire device weighs less than one pound. This tested device inflated a 16-inch diameter balloon in about eight minutes. It is estimated that such a balloon will remain aloft for at least 17 to 20 hours and will be visible for up to three to four miles. Of course, the size of the device may be varied depending upon the desired application.

Having illustrated and described the principles of my invention with reference to one preferred embodiment, it should be apparent to those persons skilled in the art that this invention can be modified in arrangement and detail without departing from such principles.

What is claimed is:

1. A signal balloon apparatus comprising:
   charge container means for containing a first substance which reacts with a second substance to produce a lighter-than-air gas, said charge container means having a plurality of apertures therethrough;
   liner means for preventing the first substance from passing through the apertures;
   activation container means for containing the second substance and having an opening therein for receiving said charge container means, wherein the second substance contacts the first substance through the apertures and liner means when said charge container means is received by said activation container means so that the substances react and produce the lighter-than-air gas, the lighter-than-air gas passing from said charge container means through said liner means and apertures and into said activation container means;
   balloon assembly means for trapping the gas from said activation container means;
   said charge container means also including covering means for preventing the second substance from contacting the first substance when said covering means is in a first position and for allowing the second substance to contact the first substance when said covering means is in a second position.

2. An apparatus according to claim 1 wherein said covering means comprises a one-piece covering member for covering the apertures when in said first position.

3. An apparatus according to claim 1 wherein the apertures are through a wall of said charge container means, said liner means being positioned on one side of the wall, said covering means being attached to said charge container means on the other side of the wall when in said first position and being detached from said charge container means when in said second position, and wherein the wall separates said covering means from said liner means so that when said covering means is removed from said first position to said second position it does not break said liner means.

4. A signal balloon apparatus comprising:
   charge container means for containing a first substance which reacts with a second substance to produce a lighter-than-air gas, said charge container means having a plurality of apertures therethrough;
   liner means for preventing the first substance from passing through the apertures;
   activation container means for containing the second substance and having an opening therein for receiving said charge container means, wherein the second substance contacts the first substance through the apertures and liner means when said charge container means is received by said activation container means so that the substances react and produce the lighter-than-air gas, the lighter-than-air gas passing from said charge container means through said liner means and apertures and into said activation container means;
   balloon assembly for trapping the gas from said activation container means, said balloon assembly means including stopper means for sealing said activation container means when said activation container means receives said charge container means, said stopper means having a passageway therethrough in communication with the interior of said second container means;
   said balloon assembly means also includes balloon means attached to said stopper means with the interior of said balloon means in communication with the passageway, said balloon means being inflated by the lighter-than-air gas which passes into it from said second container means through the passageway; and
   said balloon assembly means includes attachment means for attaching said stopper means to said charge container means, wherein when said charge container means is received in said activation container means said attachment means positions said stopper means in position to seal said activation container means.

5. An apparatus according to claim 4 wherein the longitudinal axis of said charge container means and the longitudinal axis of said stopper means are the same.

6. A signal balloon apparatus comprising:

a charge containing cylinder for containing a first substance which reacts with a second substance to produce a lighter-than-air gas, the wall of said charge container having a plurality of rows of apertures therethrough, each row of apertures being positioned generally in a plane perpendicular to the longitudinal axis of said cylinder;

liner means positioned inside said cylinder and adjacent the wall for preventing the first substance from passing through the apertures;

a removable covering strip attached to the outside of said cylinder for covering said apertures to prevent the second substance from entering said cylinder prior to the removal of said covering strip;

balloon assembly means integral with said charge container, said balloon assembly means including a stopper having a passageway therethrough and a balloon having its neck attached to the stopper with the interior of the balloon in communication with the passageway;

activation container means for containing the second substance and having an opening therein for receiving said cylinder, wherein when the cylinder is received by said activation container means, said stopper seals the activation container means with the passageway of the stopper in communication with the interior of said activation container means, the second substance contacts the first substance through the apertures;

and the lighter-than-air gas produced by the reaction passes from said cylinder through the apertures into said activation container and from the activation container through the passageway into the balloon.

7. An apparatus according to claim 6 wherein said balloon assembly means includes a cinch surrounding the neck of the balloon, said cinch being tightened to close the balloon after it is inflated with the lighter-than-air gas.

8. An apparatus according to claim 6 wherein the apertures of each row are equally spaced around the periphery of the wall.

9. An apparatus according to claim 6 wherein the first substance is calcium hydride and the second substance is water.

10. An apparatus according to claim 6 wherein the cylinder is made of a lightweight heat conducting metal.

* * * * *

UNITED STATES PATENT AND TRADEMARK OFFICE
CERTIFICATE OF CORRECTION

PATENT NO. : 4,123,987
DATED : November 7, 1978
INVENTOR(S) : Richard C. Singerle and Gail M. Denman It is certified that error appears in the above-identified patent and that said Letters Patent are hereby corrected as shown below:

Col. 4, line 9 "conventenal" should read --conventional--.

Col. 4, line 9 "of" should read --or--.

Col. 6, line 50, after "assembly" insert --means--.

Signed and Sealed this

Tenth Day of April 1979

[SEAL]

Attest:

RUTH C. MASON
Attesting Officer

DONALD W. BANNER
Commissioner of Patents and Trademarks